(12) United States Patent
Adams et al.

(10) Patent No.: US 6,719,385 B1
(45) Date of Patent: Apr. 13, 2004

(54) SYSTEM FOR HOLDING A DEVICE IN A COMPUTER SYSTEM

(75) Inventors: Jacklin Ann Adams, Cary, NC (US); Walter Adrian Goodman, Raleigh, NC (US); Timothy Samuel Farrow, Apex, NC (US); Dean Frederick Herring, Youngsville, NC (US); Joseph Anthony Ho-Lung, Wake Forest, NC (US); William Fred Otto, Apex, NC (US); Jeffrey Tate, Cary, NC (US); Jeffrey Jay Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/483,614

(22) Filed: Jan. 14, 2000

(51) Int. Cl.[7] .............................. A47B 88/04; H05K 7/14
(52) U.S. Cl. .................................... 312/334.1; 361/685
(58) Field of Search ............................ 312/334.1, 334.7, 312/334.14, 334.16, 223.1, 223.2, 319.1, 333; 361/685, 725, 727; 248/568, 638; 411/508, 913, 903

(56) References Cited

U.S. PATENT DOCUMENTS

| | | | | | |
|---|---|---|---|---|---|
| 4,566,750 A | * | 1/1986 | Umezu | ...................... | 411/33 X |
| 4,896,777 A | * | 1/1990 | Lewis | ...................... | 361/685 X |
| 4,964,017 A | * | 10/1990 | Jindrick et al. | ......... | 361/685 X |
| 5,136,466 A | * | 8/1992 | Remise et al. | .............. | 361/685 |
| 5,332,306 A | * | 7/1994 | Babb et al. | ............. | 312/334.16 |
| 5,463,527 A | * | 10/1995 | Hager et al. | ................. | 361/685 |
| 5,599,080 A | * | 2/1997 | Ho | .......................... | 312/334.7 |
| 6,094,342 A | * | 7/2000 | Dague et al. | ........... | 312/333 X |
| 6,097,608 A | * | 8/2000 | Berberich et al. | ...... | 361/685 X |
| 6,130,817 A | * | 10/2000 | Flotho et al. | ......... | 312/223.2 X |
| 6,299,817 B1 | * | 10/2001 | Parkinson | ................... | 264/402 |

FOREIGN PATENT DOCUMENTS

| | | | | |
|---|---|---|---|---|
| JP | 40-6125184 | * | 5/1994 | ................. 361/685 |
| WO | WO 98/39704 | * | 9/1998 | |

* cited by examiner

*Primary Examiner*—James O. Hansen
(74) *Attorney, Agent, or Firm*—Sawyer Law Group, LLP; Carlos Munoz-Bustamante

(57) ABSTRACT

A system for holding a device in a computer system, the computer system including a drive cage for holding the device, is disclosed. The system comprises a first rail coupled to one side of the device and adapted to fit into the drive cage and a second rail coupled to the device at a side opposite the one side and adapted to fit into the drive cage, wherein the first and second rails are coupled to the device without requiring a tool. Computer systems utilizing the system in accordance with the present invention, will be better equipped to handle the acoustic vibrations created during the operation of different types of drives such as Direct Access and Storage Devices (DASDs). Accordingly, this will enable computer system manufacturers to incorporate faster DASDs without acoustically coupling the DASD to the chassis. Furthermore, by employing a screw-less rail, PC manufacturers and users will no longer be required to use a tool to remove the attached rails. This facilitates the easy removal and reinstallation of DASDs when interchanging computer components.

14 Claims, 3 Drawing Sheets

SYSTEM FOR HOLDING A DEVICE IN A COMPUTER SYSTEM

FIELD OF THE INVENTION

The present invention relates to generally to computer system components and specifically to a system for holding a drive in a computer system.

BACKGROUND OF THE INVENTION

Personal computers (PC) typically employ Direct Access and Storage Devices (DASDs) such as hard disk drives, tape drives, and magnetic drum devices. These devices are typically maintained in the mechanical chassis of a computer housing. FIG. 1 is an example of typical computer housing configuration. This configuration includes a DASD 10 that slides into or is bolted to the mechanical chassis 12 of the computer housing 14.

However, a problem facing the PC industry is that these devices are prone to generating acoustic vibrations during their operation. For example, in a hard disk drive (HDD), as the read/write heads manipulate data, they impart vibrational movement onto the mechanical chassis. This movement ultimately threatens the integrity of the data being handled by the HDD. Furthermore, as HDDs become faster, this acoustic problem becomes a more significant concern.

Another problem facing the industry is the inability of users and manufacturers to quickly interchange DASDs. DASDs are typically mounted to the mechanical chassis of a computer housing via a pair of screws. For personal computer (PC) manufactures and users, this is problematic. By using screws to attach the DASD, the PC manufacturer/user is subsequently forced to use a screw driver or similar tool to remove the DASD. Since PC retailers and service organizations typically charge hourly rates for assembling and disassembling computer systems, it is desirable that assembling/disassembling process take as little time as possible.

Accordingly, what is needed is a system for holding a drive in a computer that solves these problems. The present invention addresses these needs.

SUMMARY OF THE INVENTION

A system for holding a device in a computer system, the computer system including a drive cage for holding the device, is disclosed. The system comprises a first rail coupled to one side of the device and adapted to fit into the drive cage and a second rail coupled to the device at a side opposite the one side and adapted to fit into the drive cage, wherein the first and second rails are coupled to the device without requiring a tool.

Computer systems utilizing the system in accordance with the present invention, will be better equipped to handle the acoustic vibrations created during the operation of different types of drives such as Direct Access and Storage Devices (DASDs). Accordingly, this will enable computer system manufacturers to incorporate faster DASDs without acoustically coupling the DASD to the chassis. Furthermore, by employing a screw-less rail, PC manufacturers and users will no longer be required to use a tool to remove the attached rails. This facilitates the easy removal and reinstallation of DASDs when interchanging computer components.

DETAILED DESCRIPTION

The present invention relates to a system for holding a device in a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The system in accordance with the present invention is presented in the context of a preferred embodiment. The preferred embodiment allows for the use of a tool-less DASD railing system for a computer. Computer systems utilizing the system in accordance with the present invention, will be better equipped to isolate or dampen the acoustic vibrations created during the operation of different types of drives such as Direct Access and Storage Devices (DASDs). Accordingly, this will enable computer system manufacturers to incorporate faster DASDs and dampen acoustic vibrations. Furthermore, by employing a screw-less rail, PC manufacturers and users will no longer be required to use a tool to remove the DASDs. This facilitates the easy removal and reinstallation of DASDs when interchanging computer components.

Figure 1:
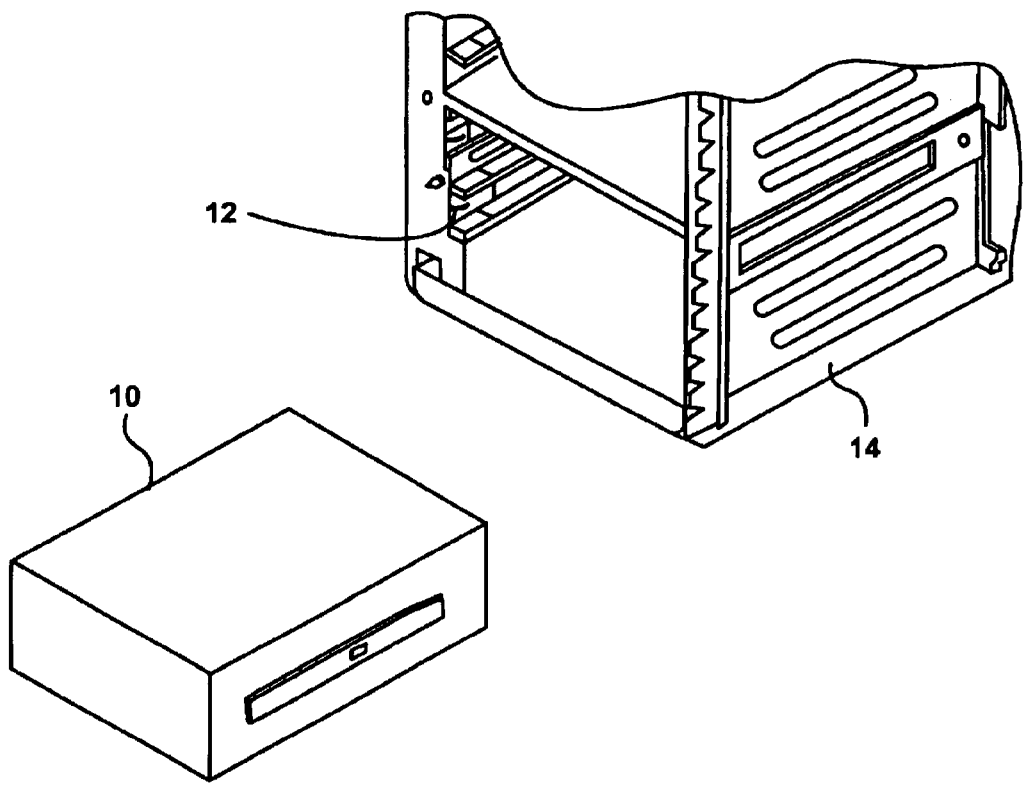
FIG. 1 is an example of typical computer housing configuration.
Figure 2:
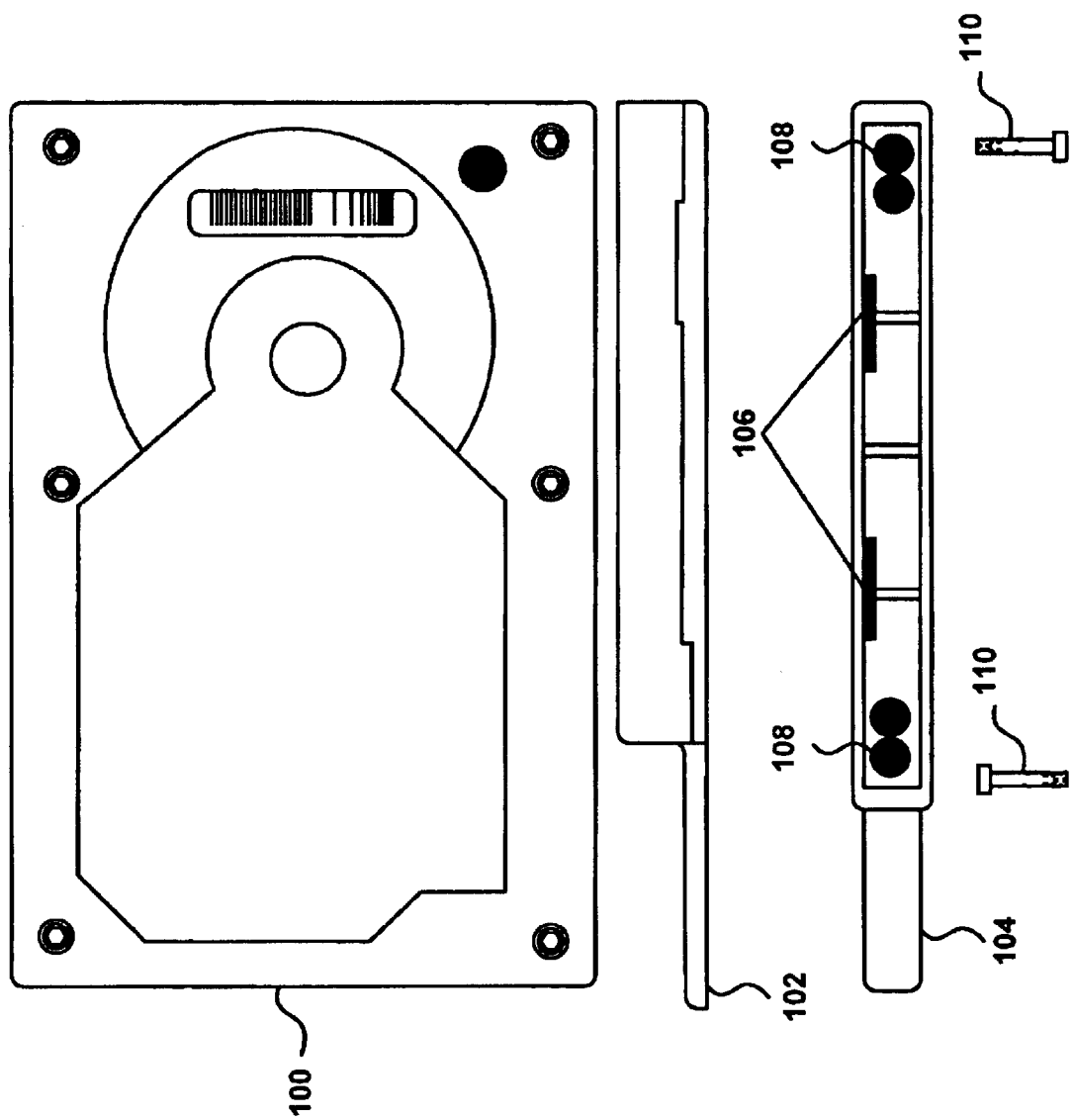
FIG. 2 is the preferred embodiment of the system in accordance with the present invention.

For a further description of the preferred embodiment of the system in accordance with the present invention please refer to FIG. 2. The system comprises a disk drive 100, a first rail portion 102 and a second rail portion 104. Each of the rail portions 102, 104 preferably comprises a flexible plastic material 106. Coupled to the flexible plastic material 106 are acoustic dampeners 108. These acoustic dampeners 108 are preferably made of a soft elastomer grommet material which is molded onto the flexible plastic material 106. Finally, pins 110 are insert-molded into each acoustic dampener 108.

Although the preferred embodiment of the system in accordance with the present invention contemplates being utilized with a plastic material, it should be understood that one of ordinary skill in the art will readily recognize that the system in accordance with the present invention could be utilized with a variety of different types of materials, including metal materials, while remaining within the spirit and scope of the present invention.

Figure 3:
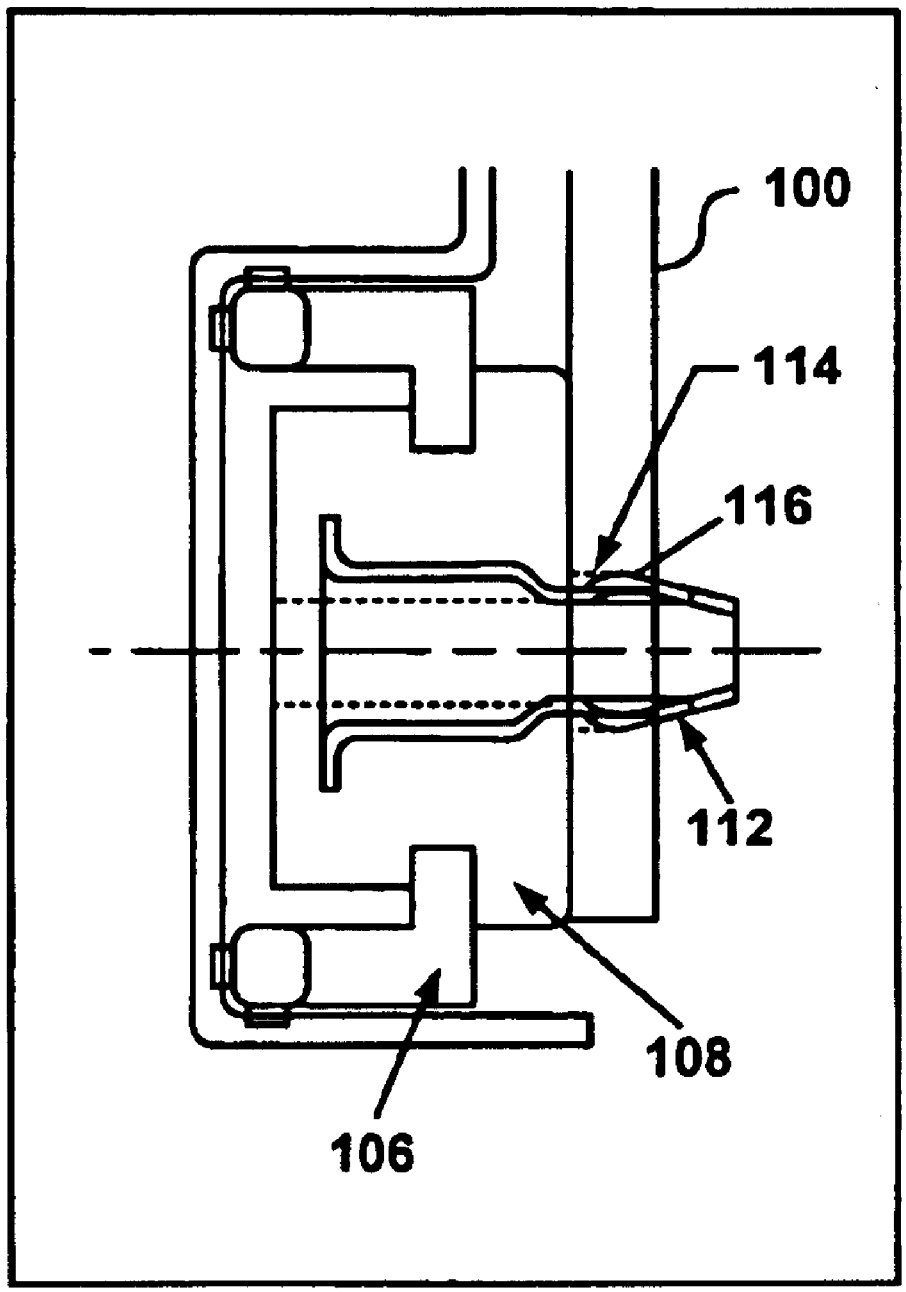
FIG. 3 is an exploded view of a pin configuration in accordance with the preferred embodiment of the present invention.

For a better understanding of the system in accordance with the preferred embodiment of the present invention, please refer now to FIG. 3. FIG. 3 is an exploded view of a pin configuration in accordance with the present invention. Each pin 110 is preferably comprised of a metal or plastic material and includes a collapsible tip 112 that fits into an associated hole 114 located on either side of the disk drive 100. After entering the associated hole 114 of the disk drive 100, the collapsible tip 112 collapses down to the inner diameter of the associated hole 114 and retains itself by means of a knuckle 116 on the outside diameter of the collapsible tip 112.

Although the preferred embodiment of the present invention contemplates utilizing a pin configuration, it should be understood that one of ordinary skill in the art will readily recognize that the system in accordance with the present invention could be utilized with a variety of different configurations while remaining within the spirit and scope of the present invention.

Because the acoustic dampeners 108 are molded to the plastic material 106 and the pin 110 is molded into the acoustic dampeners 108, wherein the pin is integrally formed within the dampener (see FIG. 3). A strong coupling is not created between the dampeners 108 and the associated hole 114 such that the vibrational forces created during the operation of the device are not transferred between the associated hole 114 and the pin 110. This is crucial to the performance of the disk drive. If there is any movement inside the associated hole 114 during the operation of the disk drive, drive performance could be degraded.

By utilizing pins instead of conventional screw-type bolt, the rails are able to be quickly attached and detached without the use of a tool. Furthermore, by employing the use of acoustic dampeners, the vibrational movement of the DASD during operation is absorbed by the dampeners thereby minimizing the transfer of vibrational movement onto the mechanical chassis. Accordingly, a computer system employing the system in accordance with the present invention can be "tuned" according to specific performance requirements. Tuning involves the selection of materials based on the material properties and the geometries of the combination of parts (rail, acoustic dampener, disk drive, mechanical chassis, etc.)

For example, a disk drive operating at 7200 rpm has certain acoustic and performance requirements. Based on these requirements, the geometries of the acoustic dampener material and plastic material (i.e. hardness, thickness, cross-sectional area, etc.) can be selected to conform with these requirements. Furthermore, because acoustic and performance requirements are typically divergent parameters, it is important that a computer system having the tuning capability to meet these requirements. This becomes even more critical as disk drive speeds get faster and the acoustic and performance requirements become more stringent.

Although the preferred embodiment of the system in accordance with the present invention contemplates being utilized with a disk drive device, it should be understood that one of ordinary skill in the art will readily recognize that the system in accordance with the present invention could be utilized with a variety of devices while remaining within the spirit and scope of the present invention.

Computer systems utilizing the system in accordance with the present invention, will be better equipped to handle the acoustic vibrations created during the operation of different types of drives such as Direct Access and Storage Devices (DASDs). Accordingly, this will enable computer system manufacturers to incorporate faster DASDs and remain within a desired acoustic specification. Furthermore, by employing a screw-less rail, PC manufacturers and users will no longer be required to use a tool to remove the attached rails. This facilitates the easy removal and reinstallation of DASDs when interchanging computer components.

Although the present invention has been described in accordance with the embodiments shown, one of ordinary skill in the art will readily recognize that there could be variations to the embodiments and those variations would be within the spirit and scope of the present invention. For example, another embodiment of the system in accordance with the present invention could employ the use of conventional screw-type bolts instead of pins. This would eliminate the tool-less removability of the rails, while maintaining the advantages related to the use of the acoustic dampeners. Accordingly, many modifications may be made by one or ordinary skill in the art without departing from the spirit and scope of the appended claims.

What is claimed is:

1. A system for mounting a component in a mechanical chassis of a computer system the system comprising:

a first rail adapted to fit into the mechanical chassis, the first rail comprising at least one elastomeric acoustic dampener form-molded onto the fist rail and a pin insert-molded into the at least one elastomeric acoustic dampener; and a second rail adapted to fit into the mechanical chassis, the second rail comprising at least one elastormeric acoustic dampener form-molded onto the second rail and a pin insert-molded into the at least one elastormeric acoustic dampener, wherein the pin of the first rail allows the first rail to be attached to one side of the component and the pin of the second rail allows the second rail to be attached to a side opposite the one side of the component, and wherein the component is mounted in the mechanical chassis via the first rail and the second rail.

2. The system of claim 1 wherein each of the first and second rails further comprise:

a flexible portion, wherein the at least one elastomeric acoustic dampener and its corresponding pin are coupled to the flexible portion.

3. The system of claim 2 wherein the flexible portion comprises a plastic material.

4. The system of claim 2 wherein the at least one pin includes a collapsible tip.

5. The system of claim 1, wherein the component comprises a direct access and storage device.

6. A system for mounting a component in a mechanical chassis of a computer system, the system comprising:

a first flexible rail adapted to fit into the mechanical chassis, the first flexible rail comprising at least one elastomeric acoustic dampener form-molded onto the first rail and a pin insert-molded into the at least one elastormeric acoustic dampener; and a second flexible rail adapted to fit into the mechanical chassis, the second flexible rail comprising at least one elastomeric acoustic dampener form-molded onto the second rail and a pin insert-molded into the at least one elastomeric acoustic dampener, wherein the pin of the first flexible rail allows the first flexible rail to be directly attached to one side of the component and the pin of the second flexible rail allows the second flexible rail to be directly attached to a side opposite the one side of the component, and wherein the component is mounted in the mechanical chassis via the first rail and the second rail.

7. The system of claim 6 wherein each of the first and second flexible rails comprises a plastic material.

8. The system of claim 6 wherein the at least one pin includes a collapsible tip.

9. The system of claim 6 wherein the component comprises a direct access and storage device.

10. A system for mounting a direct access and storage device (DASD) in a mechanical chassis in a computer system, the system comprising:

a first flexible rail adapted to fit into the mechanical chassis, the first flexible rail comprising at least one elastomeric acoustic dampener form-molded onto the first rail and means for attaching the first flexible rail directly to one side of the direct access and storage device; and a second flexible rail adapted to fit into the mechanical chassis, the second flexible rail comprising at least one elastomeric acoustic dampener form-molded onto the second rail and means for attaching the second flexible rail directly to a side opposite the one side of the direct access and storage device independent of the first flexible rail, wherein the direct access and storage device is mounted in the mechanical chassis via the first rail and the second rail.

11. The system of claim 10 wherein the means for attaching the first and second flexible rails comprises at least one screw.

12. The system of claim 10 wherein each of the first and second flexible rails comprises a plastic material.

13. A system for mounting a direct access and storage device (DASD) in a mechanical chassis in a computer system, the system comprising:

a first rail adapted to fit into the mechanical chassis, the first rail comprising a plastic portion, at least one acoustic dampener comprising an elastomer material form-molded onto the plastic portion, and at least one pin including a collapsible tip, the at least one pin being insert-molded into the elastomeric acoustic dampener for directly attaching the first rail to one side of the direct access and storage device after the at least one pin has been insert-molded into the dampener of the first rail; and a second rail adapted to fit into the mechanical chassis, the second rail including a plastic portion, at least one acoustic dampener comprising an elastomer material form-molded onto the plastic portion, and at least one pin including a collapsible tip, the at least one pin being insert-molded into the elastomeric acoustic dampener for directly attaching the second rail to a side opposite the ore side of the direct access and storage device independent of the first rail after the at least one pin has been insert-molded into the dampener of the second rail, and wherein the direct access and storage device is mounted in the mechanical chassis via the first rail and the second rail.

14. The mounting system of claim 13 wherein the direct access and storage device is slidably mounted into the mechanical chassis via the first rail and the second rail.

* * * * *